US006182353B1

(12) United States Patent
Grunze et al.

(10) Patent No.: US 6,182,353 B1
(45) Date of Patent: *Feb. 6, 2001

(54) SWAGING TOOL FOR BEARING INSTALLATION

(75) Inventors: Mark R. Grunze, Naperville; Robert E. Franzen, Wheaton, both of IL (US)

(73) Assignee: Rexnord Corporation, Milwaukee, WI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/614,936

(22) Filed: Mar. 11, 1996

(51) Int. Cl.[7] .............................. B23P 19/04; B21D 53/10
(52) U.S. Cl. .................................. 29/724; 29/258; 29/464
(58) Field of Search ............................ 29/724, 244, 256, 29/270, 258, 464, 898.07, 898.09, 898.062

(56) References Cited

U.S. PATENT DOCUMENTS

| 3,184,941 | 5/1965 | Schneider ................................ 72/126 |
| 3,262,298 | 2/1964 | Samuels et al. ........................ 72/117 |
| 3,444,606 | 5/1969 | Jones ...................................... 29/200 |
| 3,639,961 | 2/1972 | Shiflet ............................. 29/149.5 B |
| 3,986,241 | 10/1976 | Ruppe .................................... 29/240 |
| 4,318,212 | 3/1982 | Schnabel ............................... 29/252 |
| 4,428,105 | 1/1984 | Abott et al. ..................... 29/149.5 B |
| 4,476,617 | 10/1984 | Kobylarz ............................... 29/264 |
| 4,574,448 | 3/1986 | Brandenstein et al. ............. 29/283.5 |
| 5,111,575 | 5/1992 | Grunze et al. ......................... 29/725 |
| 5,165,169 | 11/1992 | Boyce ............................... 29/989.08 |
| 5,184,402 | 2/1993 | Kadokawa ........................ 29/989.07 |
| 5,213,455 | 5/1993 | Reynolds .............................. 408/82 |

FOREIGN PATENT DOCUMENTS

| 1342944 | 10/1963 | (FR) . |
| 2442098 | 11/1979 | (FR) . |
| 2643584 | 2/1990 | (FR) . |

*Primary Examiner*—David P. Bryant
*Assistant Examiner*—Marc W. Butler
(74) *Attorney, Agent, or Firm*—Quarles & Brady LLP

(57) ABSTRACT

Disclosed herein is a tool for swaging a bearing into an opening in a bearing housing, which apparatus is operable in confined spaces, such as in an aircraft application. The tool has a threaded elongated member or bolt that extends through the bore of the bearing. The tool also has a roller fixture assembly adapted to be positioned on one side of the bearing and positioned on one end of the elongated member. The roller fixture assembly has a number of rollers and a roller fixture shell that supports the rollers for engagement with the bearing to swage the bearing against the bearing housing. The bearing swaging tool also has a locating fixture assembly adapted to be positioned on the opposite side of the bearing from the roller fixture assembly. The locating fixture assembly is supported on the other end of the elongated member and includes a locating fixture with a first side adapted to be positioned against the bearing and bearing housing. The locating fixture assembly includes means for selectively controlling the amount of axial movement of the locating fixture with respect to the elongated member in response to rotation of the elongated member with respect to the bearing.

20 Claims, 1 Drawing Sheet

SWAGING TOOL FOR BEARING INSTALLATION

FIELD OF THE INVENTION

The present invention relates to a bearing tool for swaging a bearing into a bearing housing, and more particularly, to a bearing swaging tool that is operable in confined spaces without the need for clamps or power tools.

BACKGROUND PRIOR ART

Bearing swaging tools are commonly used, for example, in the aircraft industry to fix bearings in place in bores adapted to house those bearings. The prior art provides several structures for swaging bearings to bearing housings.

A bearing swaging tool is illustrated in U.S. Pat. No. 5,111,575, issued to Grunze, et al. on May 12, 1992. Other structures for swaging bearings to bearing housings are provided in the following U.S. Pat. No. 3,262,298, issued Jul. 26, 1966; U.S. Pat. No. 3,444,606, issued May 20, 1969; U.S. Pat. No. 3,639,961, issued Feb. 8, 1972; U.S. Pat. No. 3,986,241, issued Oct. 19, 1976; U.S. Pat. No. 4,318,212, issued Mar. 9, 1982; U.S. Pat. No. 4,428,105, issued Jan. 31, 1984; U.S. Pat. No. 4,476,617, issued Oct. 16, 1984; and U.S. Pat. No. 4,574,448, issued Mar. 11, 1986.

In the aircraft industry, bearing swaging tools are used not only in fabrication of airplanes, but also in installation of replacement bearings during maintenance of the aircraft. In many cases, the bearings are located in confined spaces. Many prior art bearing swaging tools are not useful in confined spaces, as they require a drill press, or other external structure, such as C-clamp structure, for application of the axial force required for swaging. Disassembly of the aircraft is normally required if these bearing swaging tools are used.

Additionally, many prior art bearing swaging constructions involve complicated structures which result in increased manufacturing costs or are impractical and difficult for use in confined spaces.

U.S. Pat. No. 5,111,575, issued to Grunze, et al. on May 12, 1992, shows a bearing swaging tool which is an improvement over prior art tools but requires the use of a fairly complex structure, and the operator of the swaging tool must rotate two separate members of the tool to perform an accurate and efficient swaging operation. Additionally, the swaging tool of the '575 patent requires a substantial number of components which results in increased cost of manufacture, and an increase in the size of the swaging tool.

The prior art structures do not provide a bearing swaging tool that works by rotation of a single member of the swaging tool wherein the rotation of the single member results in the tightening of the bearing swaging tool as well as the rotation of swaging members while still permitting control of the amount of rotation with respect to the bearing without undue tightening of the swaging members against the bearing.

SUMMARY OF THE INVENTION

The invention includes a bearing swaging tool that solves problems of the prior art. More particularly, the invention includes a bearing swaging tool that is smaller, less expensive to manufacture, and more easily operated through rotation of only a single member of the tool. The bearing swaging tool embodying the invention allows for control of the amount of rotation of the swaging member of the tool with respect to the bearing without undue tightening of the swaging member against the bearing.

The invention provides a swaging tool construction wherein a roller fixture assembly located on one side of a bearing is selectively advanced via an elongated threaded member toward a locating fixture assembly located on the opposite side of the bearing at a rate less than the thread pitch on the threaded member because slippage is provided within the locating fixture assembly. The roller fixture assembly is also rotated via rotation of the same threaded member for proper swaging of the bearing.

One advantage of this invention is that it is easier to use than bearing swaging tools in the prior art. This advantage is due to the incorporation of a structure which allows the roller fixture to rotate with the threaded member, while the axial movement of the roller fixture assembly toward the bearing is selectively less than the threaded pitch of the threaded member due to selective slippage incorporated into the locating fixture. An operator simply turns the same threaded member to both selectively tighten the swaging tool against the bearing and to rotate the roller fixture to swage the bearing. The selective slippage built into the locating fixture of the swaging tool avoids the problem of advancing the roller fixture toward the bearing at a rate which would be too fast for proper swaging.

Other advantages of this invention are the smaller size and reduction in the cost of manufacture of the bearing swaging tool. These reductions are due to the use of less material and fewer components in the manufacture of the bearing swaging tool.

One embodiment of the invention includes a bearing swaging tool for swaging a bearing into an opening in a bearing housing, the bearing having opposite sides and an axially extending bore therethrough. The tool includes an elongated threaded member that extends through the bore of the bearing. The tool also includes a roller fixture assembly adapted to be positioned on one side of the bearing and positioned on one end of the elongated member. The roller fixture assembly has a number of rollers and a roller fixture shell that supports the rollers for engagement with the bearing to swage the bearing against the bearing housing. The bearing swaging tool also has a locating fixture assembly adapted to be positioned on the opposite side of the bearing from the roller fixture assembly. The locating fixture assembly is supported on the other end of the elongated member and includes a locating fixture with one side adapted to be positioned against the bearing. The locating fixture includes means for selectively controlling the amount of axial movement of the locating fixture with respect to the elongated member in response to rotation of the elongated member with respect to the bearing.

Other features and advantages of the invention will become apparent to those skilled in the art upon review of the following detailed description, claims and drawings.

Figure 1:
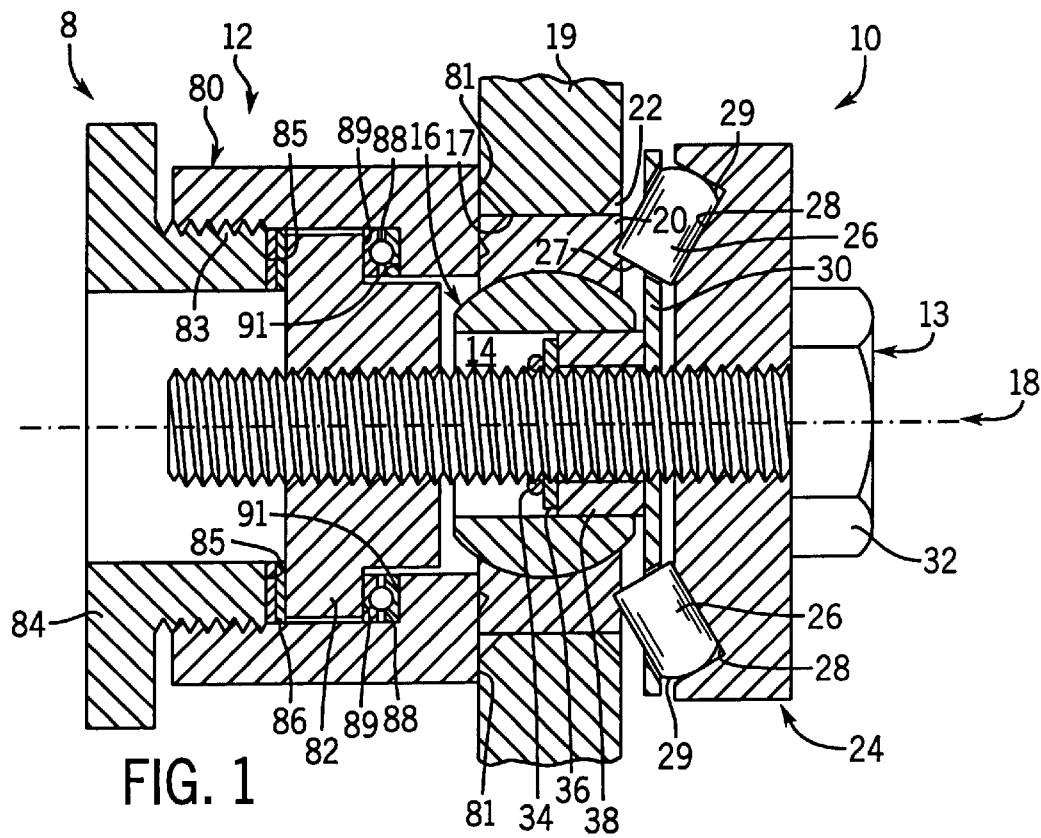
FIG. 1 is a cross-sectional view of a swaging tool embodying the invention, and a bearing and a bearing housing.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENT

Figure 2:
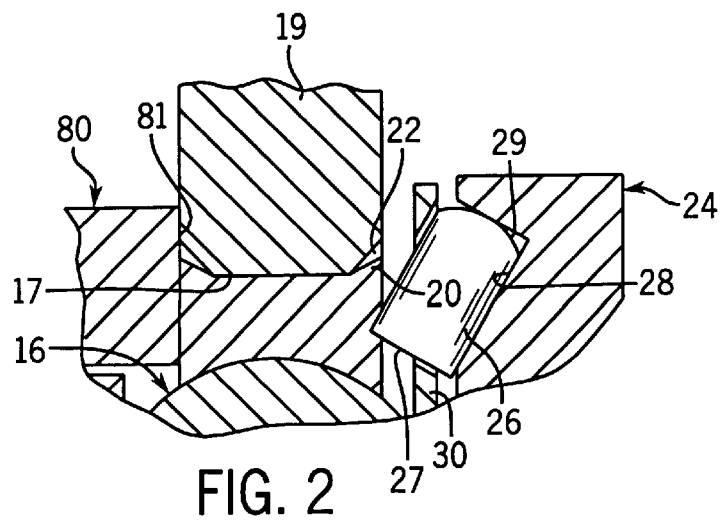
FIG. 2 is an enlarged partial view of the swaging tool and the bearing and bearing housing illustrated in FIG. 1.

Referring to FIG. 1, a swaging tool 8 embodying the invention is illustrated, the swaging tool being employed to secure a bearing 16 into the bore 17 of a bearing housing 19. The swaging tool 8 includes three major assemblies which are individually assembled before use of the swaging tool. The major assemblies are a roller fixture assembly 10, a locating fixture assembly 12, and a threaded elongated member or bolt 13. When the swaging tool is assembled, the roller fixture assembly 10 and the locating fixture assembly 12 are tightly threaded together through a bore 14 in a bearing 16 on the threaded elongated member 13. The locating fixture assembly 12 includes means for selectively controlling the amount of axial movement of the locating fixture assembly 12 with respect to the elongated member 13 in response to rotation of the elongated member 13 with respect to the bearing 16. The roller fixture assembly 10 is rotated about an axis 18 via the elongated member 13 to swage bearing lip 20 into a bearing housing chamfer 22 without undue tightening of the roller fixture assembly 10 against the bearing 16. The structure and function of the invention will be more clearly understood when reading the following description of the various components that comprise the elongated member 13, the roller fixture assembly 10 and the locating fixture assembly 12, reference being made to FIGS. 1 and 2.

The elongated member 13 in the illustrated embodiment is a bolt including a first end having a hex head 32 that is adapted to be engaged by a wrench (not shown). The bolt 13 extends through the bore 14, and has a central axis 18.

The roller fixture assembly 10 includes a roller fixture body or shell 24 which houses or supports the other components of the roller fixture assembly. The roller fixture shell 24 is supported on the bolt 13 at the end of the elongated member having the head 32, and positioned on one side of the bearing 16. In the preferred embodiment, the roller fixture shell 24 has a threaded bore passing therethrough having a centerline along axis 18. The roller fixture shell 24 is threaded onto the bolt 13, and positioned against the head 32. The roller fixture assembly 10 rotates with the bolt 13 when the bolt 13 is rotated.

A generally v-shaped groove 28 is centrally formed in one side or face of the roller fixture shell 24 about the axis 18, and is configured to receive rollers 26. Each roller 26 is generally cylindrical in exterior shape, and has a circumferential exterior surface which contacts the bearing lip 20 during swaging, a generally planar end 27, and a convex end 29 opposite the generally planar end. Each roller 26 is positioned in the generally v-shaped groove 28 with at least a portion of its circumferential exterior surface contacting one side of the groove 28, and with its convex end 29 facing away from the axis 18 and making a point contact with the other side of the groove 28. Thus, the groove 28 orients each of the rollers 26 at an angle that is non-perpendicular to the axis 18 so that they apply a swaging force to bearing lip 20 at an angle that is non-parallel to the axis 18.

At least three rollers 26 are retained and separated in the groove 28, in angularly spaced relation, by a retainer ring 30. In the illustrated embodiment, three rollers 26 are housed in the groove 28, and are angularly separated by 1200 by the retainer ring 30 having three apertures, each of which expose a portion of a roller 26, and support the rollers for free rotation.

The retainer ring 30 is adjustably supported in axially spaced relation with respect to the roller fixture shell 24 by an assembly comprising an O-ring 34, a washer 36, and a sleeve 38. The sleeve 38 is a cylindrical member which is housed in the bore 14 of the bearing and surrounds the bolt 13. The sleeve 38 has one end that contacts the retainer ring 30, and another end that abuts the washer 36. The circular washer 36 surrounds the elongated member 13 and has one side that contacts the sleeve 38, and another side that contacts the O-ring 34. The O-ring 34 is threaded onto the bolt 13, and is held in position by the threads of the bolt. The O-ring 34 contacts the washer 36, and holds the washer 36 in axial position with respect to the bolt. The washer 36 in turn holds the sleeve 38 in axial position, and the sleeve 38 then holds the retainer ring 30 in axial position in relation to the roller fixture shell 24 such that the position of the O-ring 34 on the elongated member 13 dictates the position of the retainer ring 30 in relation to the roller fixture shell 24. The axial position of the retainer 30 is adjustable relative to the roller fixture shells 24 by adjusting the position of the O-ring 34 on the elongated member 13. This allows the retainer/ roller clearance to be adjusted for proper tracking of the rollers 26 during a swaging operation.

The sleeve 38 also functions to center the swaging tool with respect to the bearing for proper swaging. The sleeve 38 is of such a thickness that it fills that portion of the bore 14 of the bearing not occupied by the portion of the elongated member that the sleeve surrounds. By doing so, the sleeve 38 functions to maintain the axis of the elongated member in substantially the same position as axis 18. This structure aids in centering the roller fixture assembly 10 and locating fixture assemblies 12 against the bearing 16 for proper swaging.

Sleeves 38 of different sizes are utilized for swaging bearings with different diameter bores 14. The sleeve 38 is easily removed by removing the O-ring 34, washer 36, and sleeve 38 from the bolt 13, and a sleeve 38 of a different size can be substituted and supported on the bolt 13 by repositioning the washer 36 and O-ring 34 back onto the elongated member 13.

The locating fixture assembly 12 is supported on the bolt 13 at the end of the bolt opposite the head 32 and is positioned on the opposite side of the bearing from the roller fixture assembly 10.

The locating fixture assembly 12 includes a locating fixture 80 which houses or supports the other components of the locating fixture assembly 12. The locating fixture 80 has one side 81 which is positioned against the bearing 16 and housing 19. The locating fixture assembly 12 further includes a threaded member 82 which is threaded onto the end of the bolt 13, and is housed in and supports the locating fixture 80. The threaded member 82 is threaded onto the bolt 13 such that when the bolt 13 is rotated with respect to the threaded member 82 the locating fixture assembly 12 is moved toward or away from the bearing 16.

The locating fixture 80 has a threaded bore 83 on the side opposite the side 81 positioned against the bearing 16. A threaded collar 84 is threaded into the threaded bore 83 in the locating fixture 80, and is supported and partially housed by the threaded bore 83 in the locating fixture 80. The threaded collar 84 has one end 85 which is selectively engagable with friction washers 86 positioned between the end 85 of the threaded collar 84 and the threaded member 82. A low friction device such as a thrust bearing 88 is located between a shoulder 89 the threaded member 82 and a shoulder 91 of the locating fixture 80.

The locating fixture assembly 12 thus includes a means for selectively controlling the amount of axial movement of the locating fixture assembly 12 with respect to the elongated member 13 in response to rotation of the elongated member 13 with respect to the bearing 16. Although there are many ways to accomplish this selective control of axial movement, the preferred embodiment uses the foregoing structure of the locating fixture assembly 12 to accomplish this function, as is described below.

The means for selectively controlling the amount of axial movement of the locating fixture assembly 12 with respect to the elongated member 13 includes a means for selectively providing for relative rotation between the threaded member 82 and the locating fixture 80.

In operation of the locating fixture assembly, the threaded collar 84 can be threaded into the threaded bore in the locating fixture 80 in one position such that the end of the threaded collar engages the threaded member 82 via a friction device such as friction washer 86. The engagement of the threaded collar 84 and the threaded member 82 via the friction washer 86 functions to create friction which holds the threaded member 82 in place in relation to the locating fixture 80, and does not allow the threaded member 82. to rotate with respect to the locating fixture 80. The clockwise rotation of the elongated member 13 while the threaded collar 84 is in such a position results in the axial position of the locating fixture assembly 12 to be advanced toward the bearing at a rate dictated by the pitch of the thread of the elongated member 13. The locating fixture 80 can therefore be tightened against the bearing 16 with appropriate force necessary for proper swaging.

Second, the threaded collar 84 can be selectively backed off or loosened to be put in a second position such that the end of the threaded collar 84 only loosely engages, or does not engage the threaded member 82. In such a position, a reduced amount of friction, or no friction, is created between the threaded member 82 and the threaded collar 86. The threaded member 82 is therefore able to rotate relative to the locating fixture 80 when the elongated member 13 is rotated. The low friction device 88 enhances the ability of the threaded member 82 to rotate in relation to the locating fixture 80. In essence, when the elongated member 13 is rotated, the threaded member 82 rotates in the same direction as the elongated member is rotating, resulting in less axial movement of the threaded member 82 along the elongated member 13.

The rotation of the threaded member 82 in relation to the locating fixture 80 allows the axial movement of the locating fixture assembly 12 with respect to the elongated member 13 in response to rotation of the elongated member 13 to be at a rate less than the thread pitch on the threaded member dictates. This allows the roller fixture assembly 10 to be rotated for proper swaging of the bearing lip 20 into bearing housing chamfer 22 while avoiding the problem of undue tightening of the swaging tool against the bearing 16.

The present bearing swaging tool is easier to use than bearing swaging tools disclosed in the prior art. An operator simply turns the same threaded member 13 to selectively tighten the swaging tool against the bearing 16 and to rotate the roller fixture assembly 10 to swage the bearing 16. The selective slippage built into the locating fixture assembly 12 of the swaging tool avoids the problem of advancing the roller fixture assembly 10 toward the bearing 16 at a rate which would be too fast for proper swaging.

The invention can also be made smaller in size than the prior art swaging tools because fewer components and materials are needed to make the swaging tool. The smaller size results in a swaging tool which is easier to use in confined spaces. Additionally, the reduction in the number of components and the amount of material needed to produce the invention results in a reduction in the cost of manufacturing the bearing swaging tool.

Various features of the invention are set forth in the following claims.

What is claimed is:

1. A tool for swaging into an opening in a bearing housing, a bearing having opposite sides and an axially extending bore therethrough, said tool comprising:

an elongated member adapted to extend through the bore of the bearing and having a first end, and a second end;

a roller fixture assembly adapted to be positioned on one side of the bearing, fixed to said first end of said elongated member for common movement therewith, and including a plurality of rollers, and a roller fixture shell having a first side supporting said rollers for engagement with the bearing to swage the bearing against the bearing housing; and a locating fixture assembly adapted to be positioned on the opposite side of the bearing from said roller fixture assembly, supported on said second end of said elongated member, and including a locating fixture with a first side adapted to be positioned against the bearing, and said elongated member and said locating fixture including means operable for selectively controlling axial movement of said elongated member with respect to said locating fixture when swaging the bearing, wherein said locating fixture assembly further includes a threaded member threaded onto the second end of the elongated member and supporting the locating fixture, and wherein the means for selectively controlling the amount of axial movement of the elongated member with respect to the locating fixture includes means for selectively providing for relative rotation between the threaded member and the locating fixture.

2. A tool as set forth in claim 1, wherein the means for selectively providing for relative rotation includes a low friction means positioned between the locating fixture and the threaded member.

3. A tool as set forth in claim 1, wherein the means for selectively controlling the amount of axial movement of the locating fixture with respect to the elongated member further includes means for selectively preventing relative rotation between the threaded member and the locating fixture.

4. A tool as set forth in claim 3, wherein the locating fixture further includes a threaded bore, and wherein the means for selectively preventing relative rotation includes a threaded collar threaded into the threaded bore, said threaded collar having a first end for selective engagement with the threaded member.

5. A tool as set forth in claim 4, wherein the means for selectively preventing relative rotation further includes a friction means between the threaded collar and the threaded member.

6. A tool for swaging, into a bearing housing, a bearing having an axially extending bore therethrough, said tool comprising:

an elongated member adapted to extend through the bore of the bearing and having a first end, and a threaded end, a roller fixture assembly fixed to said first end of the elongated member for common movement therewith, adapted to be positioned on one side of the bearing, and including a plurality of rollers, and a roller fixture shell supporting said rollers for engagement with the bearing to swage the bearing against the bearing housing; and a locating fixture assembly adapted to be positioned on the opposite side of the bearing from said roller fixture assembly and including a threaded member threaded onto said threaded end of said elongated member, and a locating fixture supported by said threaded member such that relative rotation of said threaded end of said elongated member with respect to said threaded member causes said roller fixture assembly and said locating fixture assembly to move with respect to one another to change the space between said roller fixture assembly and said locating fixture assembly, said locating fixture including a first side adapted to be positioned against the bearing, and means for selectively engaging said threaded member with said locating fixture for axial movement of said roller fixture assembly and said locating fixture with respect to one another as said elongated member is rotated to swage the bearing.

7. A tool as set forth in claim 6, wherein the locating fixture assembly also includes means for selectively preventing relative rotation between the threaded member and the locating fixture.

8. A tool as set forth in claim 7, wherein the locating fixture includes a threaded bore, and wherein the means for selectively preventing rotation includes a threaded collar threaded into the threaded bore and supported by the locating fixture, the threaded collar being selectively engagable with the threaded member so as to selectively prevent rotation of the threaded member in relation to the locating fixture.

9. A tool as set forth in claim 8, wherein said means for selectively preventing rotation includes friction means between the threaded collar and the threaded member.

10. A tool as set forth in claim 6, wherein the means for selectively and alternatively providing for relative rotation includes a low friction means between the threaded member and the locating fixture.

11. A tool for swaging, into an opening in a bearing housing, a bearing having opposite sides and an axially extending bore therethrough, said tool comprising:

a threaded bolt adapted to extend through the bore of the bearing and having a first end, and a second end;

a roller fixture assembly adapted to be positioned on one side of the bearing, fixed to said first end of said bolt for common movement therewith, and including a plurality of rollers and a roller fixture shell having a first side supporting said rollers for engagement with the bearing to swage the bearing against the bearing housing; and a locating fixture assembly adapted to be positioned on the opposite side of the bearing from said roller fixture assembly, threaded onto said second end of said bolt, and including means axially moving said roller fixture assembly relative to said locating fixture assembly in response to rotation of said threaded bolt at a rate less than the thread pitch on said bolt dictates to swage the bearing against the housing.

12. A tool as set forth in claim 11, wherein said locating fixture assembly includes a locating fixture engagable with the opposite side of the bearing and a threaded member threaded onto the bolt, the locating fixture being supported on the threaded member for selective rotation with respect to the threaded member.

13. A tool as set forth in claim 12, wherein the locating fixture includes a threaded bore, and wherein selective rotation of the threaded member with respect to the locating fixture is influenced by a threaded collar threaded into the threaded bore and having an end for selective engagement with the threaded member.

14. A tool as set forth in claim 11, wherein said roller fixture assembly further includes a retainer having a plurality of apertures and wherein said rollers are retained in said roller fixture shell by said retainer with a portion of each of said rollers extending through one of said apertures to face the bearing, and means for supporting the retainer with respect to said roller fixture shell such that the axial position of said retainer relative to said roller fixture shell is adjustable.

15. A tool as set forth in claim 14, wherein said means for supporting the retainer includes a sleeve surrounding the bolt and housed in the inner bearing ring.

16. A tool for swaging, into an opening in a bearing housing, a bearing having axially opposite sides and a bore extending therethrough, said tool comprising:

an elongated member adapted to extend through the bore of the bearing and having a first end, and a second end;

an engagement member engaging said elongated member second end;

a roller fixture assembly fixed to said first end of said elongated member for common movement therewith, adapted to be positioned on one side of the bearing, and including a plurality of rollers, and a roller fixture shell having a first side supporting said rollers for engagement with the bearing to swage the bearing against the bearing housing; and a locating fixture assembly selectively engaging said engagement member between a slidable engagement and a fixed engagement, said locating fixture assembly including a locating fixture having a first side adapted to be positioned against the bearing, wherein when swaging a bearing, axial movement of said elongated member relative to said locating fixture is less when said locating fixture assembly is slidably engaging said engagement member than when said locating fixture assembly is fixedly engaging said engagement member.

17. A tool as set forth in claim 16, wherein the locating fixture assembly further includes a threaded member threaded onto the second end of the elongated member and supporting the locating fixture, and wherein the means for selectively and alternatively providing for slippage within the locating fixture assembly includes means for selectively and alternatively securing the threaded member in one state in which the threaded member will not rotate in relation to the locating fixture when rotational force is applied to the threaded member, and a second state in which the threaded member will rotate in relation to the locating fixture when rotational force is applied to the threaded member.

18. A tool as set forth in claim 17, wherein the locating fixture further includes a second side having a threaded bore, and wherein the means for selectively and alternatively securing the threaded member includes a threaded collar threaded into the threaded bore, and the threaded collar having a first end for selective engagement with the threaded member.

19. A tool as set forth in claim 18, wherein the means for selectively and alternatively securing the threaded member further includes friction means between the threaded collar and the threaded member.

20. A tool as set forth in claim 17, wherein the means for selectively and alternatively providing for slippage further include a low friction means between the locating fixture and the threaded member.

\* \* \* \* \*

UNITED STATES PATENT AND TRADEMARK OFFICE
CERTIFICATE OF CORRECTION

PATENT NO. : 6,182,353 B1  Page 1 of 1
DATED : February 6, 2001
INVENTOR(S) : Mark R. Grunze et al.

It is certified that error appears in the above-identified patent and that said Letters Patent is hereby corrected as shown below:

Column 3,
Line 64, after separated by "1200" should be -- 120° --.

Column 5,
Line 23, after "82" the "." should be deleted.

Signed and Sealed this

Twenty-seventh Day of November, 2001

Attest:

NICHOLAS P. GODICI
Attesting Officer   Acting Director of the United States Patent and Trademark Office